April 11, 1944.　　H. H. CARY ET AL　　2,346,470
METHOD OF MAKING GLASS ELECTRODES
Filed Aug. 2, 1940
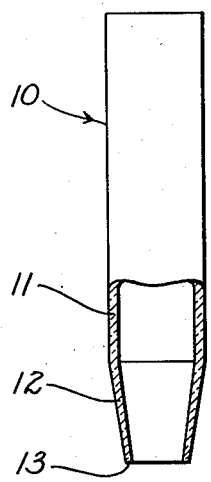
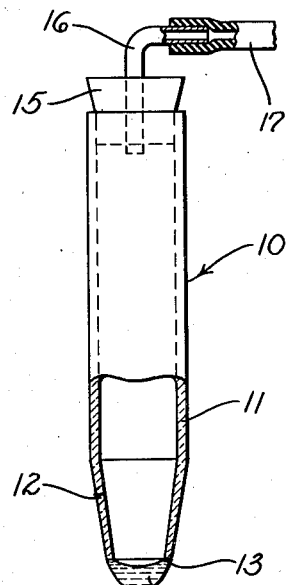
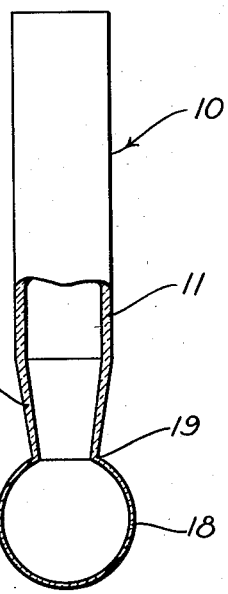
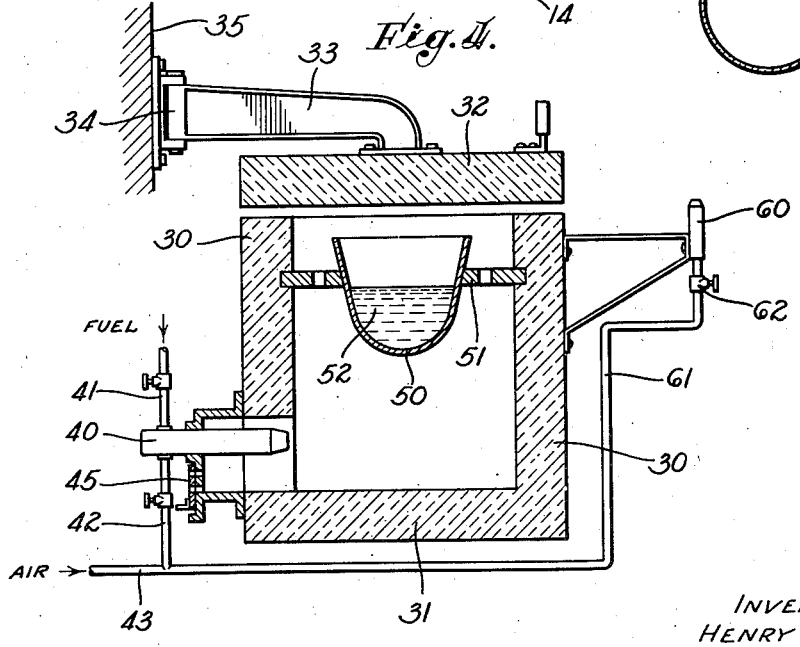
INVENTORS
HENRY H. CARY
WARREN P. BAXTER
BY
HARRIS, KIECH, FOSTER & HARRIS
ATTORNEYS.

Patented Apr. 11, 1944

2,346,470

UNITED STATES PATENT OFFICE 2,346,470

METHOD OF MAKING GLASS ELECTRODES

Henry H. Cary, South Pasadena, and Warren P. Baxter, Pasadena, Calif., assignors to National Technical Laboratories, South Pasadena, Calif., a corporation of California Application August 2, 1940, Serial No. 349,859

8 Claims. (Cl. 49—79)

This invention relates to glass electrodes and to a method for their manufacture.

Glass electrodes have widespread utility in the measurement of pH values of various solutions. As normally constructed, they comprise a thin bulb of low resistance electrode glass blown on the end of a glass supporting tube having a high electric resistance. In use, the reference solution is placed in the interior of the bulb and the exterior of the bulb is positioned in the solution which it is desired to test. A potential difference develops between the interior and exterior solutions, which is a function of the difference in pH values of the two solutions, and the measurement of this potential permits the direct determination of the pH value of the exterior solution, since the pH of the inner solution is known or its potential effect may be calibrated.

The potential developed is relatively small and the resistance of the thin glass bulb is relatively high, even when the bulb is made from selected low resistance glass. It is accordingly necessary for the accurate measurement of the potentials that the electrode system be carefully safeguarded against current leakage, and for this purpose the supporting tube is made from glass selected for its high volume and surface resistance and care is taken in manufacture to insure a perfect seal or junction between the bulb of the electrode glass and the supporting tube of high resistance glass.

The usual conventional method for making the electrodes may be briefly described as follows. The body tube is prepared as a short length of open-ended tubing and the end on which it is desired to seal the electrode bulb is warmed in a flame until it is slightly red. The low resistance electrode glass is normally prepared in the form of thin rods and the tip of such a rod is likewise heated in a flame until red and in a plastic tacky condition. At this point the heated ends of the tube and rod are brought together and worked or moved slightly one with respect to the other until it is deemed that the electrode glass has made contact with the entire rim of the supporting tube to provide an hermetic seal.

If the seal is successfully made, the operator proceeds to the next step of removing all of the electrode glass in excess of that quantity required for formation of the desired size bulb. For this purpose the rod of electrode glass is reheated, if necessary, adjacent the seal and the heated portion drawn down by stretching and broken off. This operation may require repetition until the droplet of electrode glass adhering to the supporting tube is down to the desired dimension.

As a final step, the droplet of adhering electrode glass is heated in the flame up to working temperature and blown out into a bulb of the desired dimensions.

The described conventional method is time consuming, requires much manipulative skill, and is not suited for quantity production. It is difficult even under the most favorable circumstances to attain a good seal and to restrict the bulbous portion of the assembly to the desired electrode glass.

It frequently becomes desirable to select for the electrode glass a glass of specified chemical or electrical characteristics, which glass may have a working temperature substantially below or substantially above the working temperature of the tube glass. Under these conditions satisfactory electrode assemblies cannot be made by the described procedure, because when employing a relatively high melting electrode glass the temperature must be raised to the point where the tube glass becomes very soft and blows out preferentially to the electrode glass, while if a relatively low melting point glass is employed, it is necessary to maintain the body tube below its proper working temperature, with the result that it is not properly worked and an improper or mechanically fragile seal is formed.

The indicated method is also inoperable under various other conditions. For example, it may be desirable to employ for chemical and electrical reasons certain electrode glasses which devitrify very rapidly at temperatures in the neighborhood of their working temperatures, and which, if used in accordance with the above procedure, would result in the production of devitrified and unsuitable glass electrode bulbs. Again, it may frequently be desired to incorporate in the electrode glass certain ingredients which are unstable under the conditions obtaining in the described process. Thus, for example, if an electrode glass containing lead oxide is employed, the lead oxide may be reduced to lead by contact with a reducing flame.

It is the general object of the present invention to provide a method of manufacture of glass electrodes which overcomes the above and other difficulties and which is well suited for the rapid and efficient production of glass electrodes from a wide diversity of electrode glasses, including high melting point glasses, low melting point glasses, glasses which tend to devitrify when worked, and glasses containing unstable chemical constituents, as well as providing a superior and more rapid method for the manufacture of electrode assemblies from conventional electrode glasses.

The above and other objects which will become apparent in the further course of the description, are attained in accordance with the present invention by maintaining the electrode glass as a body of molten glass into which the supporting tubes may be dipped to effect withdrawal of the desired amount of electrode glass as a droplet sealing the dipped end of the supporting tube. The invention is best described in detail with reference to the drawing, in which Figs. 1, 2, and 3 are fragmentary views of the glass electrode at various stages of its manufacture.

Fig. 4 is a cross-sectional view of a furnace containing a crucible charged with molten electrode glass.

Referring more particularly to Fig. 1, 10 is an open-ended supporting tube having a wall 11 constructed of high resistance glass. A wall 12 at one end of the tube is preferably constructed with a slight taper to terminate in a rim portion 13 on which it is desired to seal the electrode bulb. The tapering portion 12 is not essential but is a convenient aid in securing an internal metal electrode and lead wires as described, for example, in our Patent No. 2,256,733.

Fig. 2 is illustrative of the supporting tube after its rim portion 13 has been dipped or touched to the surface of a body of molten electrode glass, and shows the droplet 14 of molten electrode glass adhering to the tube in sealing relationship to all portions of the rim 13. The tube is also shown as supplied at its upper end with means for forcing air into the interior of the tube to blow the droplet into a bulb, this means including a stopper 15 and a tube 16 traversing the stopper and fixed at its outer end in a rubber tube 17 through which the blowing pressure can be conveniently supplied.

Fig. 3 shows the final electrode assembly as obtained by blowing the droplet 14 of Fig. 2 into an enlarged thin-walled bulb 18. A perfect seal is obtained between the electrode glass constituting the bulb 18 and the glass of the supporting tube 10 at the point of their juncture, as denoted by the numeral 19.

Referring to Fig. 4, there is shown a furnace having walls 30 and a floor portion 31 constructed of fire brick, fire clay, or similar material, as well as a furnace cover 32 supported by an overhanging arm 33 which is carried by a hinge 34 mounted on a fixed support 35 in such a manner that the cover 32 may be readily moved to one side to provide free access to the interior of the furnace during the dipping operation. If desired, a foot pedal (not shown) may be provided as an actuating means for the swinging aside of the cover 32.

A burner 40 is supplied for heating the furnace and is provided with a valved gas inlet pipe 41 and a valved air inlet pipe 42 leading to a compressed air line 43. Secondary air may be supplied in controlled amounts around the burner 40 by means of an adjustable damper 45. The combustion gases leave the furnace through the space intervening between the upper walls and the cover of the furnace.

A crucible 50, typically a platinum crucible, is supported within the furnace by means of a grid 51 and is shown as containing a molten body of electrode glass 52.

Exterior to the furnace there is positioned a cooling air jet 60 receiving compressed air from the pipe 43 by means of a line 61 and valve 62.

A detailed description of the method and operation may advantageously begin with consideration of the body of electrode glass 52. Since the characteristics of glass electrodes are frequently very adversely affected by the presence of impurities, it is desirable that the crucible 50 be constructed of platinum or other material which is non-corrodible under the conditions of service in order to prevent contamination of the electrode glass.

Electrode glass of the desired purity and composition is most advantageously prepared by direct fusion of the chemically pure ingredients in the crucible 50. For example, if it is desired to employ a sodium calcium silicate glass of definite composition as the electrode glass, the appropriate proportions of sodium carbonate, calcium carbonate, and silica of C. P. grade may be charged directly to the crucible 50 in finely divided form and the temperature of the mass raised to fusion. To insure homogeneity, the fused mass may be frequently stirred with a platinum rod during this formation period and is then preferably maintained quiescent until free from bubbles. In making glasses containing lead oxide or other reducible constituents, the atmosphere of the furnace is maintained strongly oxidizing by appropriate control of the air supplied through the pipe 42 and damper 45.

It will be understood that the electrode glass may be produced under other conditions, if desired, and simply remelted in the crucible 50. It will also be appreciated that if the quantity of glass manufactured in the crucible is in excess of the requirements of a given run of production, the excess may be permitted to cool in the crucible and may be conveniently stored therein until its further use is desired.

Having obtained the charge of molten electrode glass, the furnace is adjusted to keep this charge at a suitable operating temperature. With most glass compositions the melt may be maintained homogeneous over a wide temperature range, and under these circumstances we prefer to adjust the temperature of the melt on the basis of its viscosity, and surface tension, or, more specifically, on the basis of the quantity of molten glass which it is desired to remove in adherence to the supporting tube 10 when the latter is dipped into the molten glass, as presently to be described. This quantity should be such as to permit blowing a bulb of the desired size and thickness, that is, a bulb having the desired electrical resistance, and the control of the furnace temperature presents a highly advantageous method of controlling the quantity of electrode glass removed and of maintaining the electrode resistance substantially constant for a given sized bulb.

It will be appreciated that no specific working temperature may be given to cover all instances, since the viscosity and surface tension of glass at a given temperature will vary widely according to its composition. Factors other than the viscosity and surface tension also will enter in as modifying the amount of glass removed in the dipping operation. In particular, the quantity of adhering glass will also vary with the diameter of the rim of the supporting tube. For a given batch of glass, however, and a given diameter of supporting tube, the temperature conditions of the molten electrode glass which are suitable for automatically providing the appropriate quantity of glass for the production of an electrode bulb of given size and resistance may be very readily determined with a few trials.

Having brought the body of molten glass to a suitable operating temperature, the process of dipping and blowing may begin. For this purpose a suitable supporting tube such as that shown in Fig. 1 is selected and the rim portion 13 is preferably heated in the flame of a burner to incipient redness, although this step of preheating is not always essential. The hot end is then touched evenly to the surface of the molten glass, care being taken to insure uniform contact with the molten glass around the circumference of the end of the tube. Under these circumstances the molten electrode glass wets or indeed becomes molecularly associated with the circumferential surfaces, including the rim edge 13, of the supporting tube 10, thereby insuring the subsequent formation of a glass-to-glass seal of exceptionally high quality.

The relatively fluid character of the molten electrode glass permits the establishment of the desired seal or juncture without mechanical working and without any particular reference to the relative melting points of the electrode glass and the glass constituting the supporting tube.

As soon as the end of the supporting tube has uniformly contacted the surface of the molten glass, it is withdrawn, and due to effects of viscosity and surface tension it carries with it a small drop of the molten glass in sealing relationship to the bottom of the supporting tube, as shown in Fig. 2.

Subsequent to withdrawal of the supporting tube, the cover 32 is replaced on the furnace and the droplet of adhering electrode glass is permitted to cool to a proper glass-blowing or working temperature. If desired, this cooling may be hastened by positioning the droplet 14 over a jet of air supplied by the cooling jet 60. This is a particularly advantageous feature when working with electrode glasses which tend to devitrify unless cooled rapidly.

At this time, or earlier, the supporting tube is provided with a blowing connection, as shown in Fig. 2, and as soon as the droplet is cooled to a glass-blowing or working temperature it is blown into an expanded bulb of the desired size, corresponding to the bulb 18 of Fig. 3. If desired, rapid cooling of the blown bulb may be continued by its continued maintenance in the air from the jet 60, this again being of particular value when working with glasses which tend to devitrify.

Under most circumstances a bulb of the desired size and thinness may be blown from the adhering glass as the result of a single dip, particularly if the molten glass is kept at suitable temperatures as described above. Under certain circumstances, however, when it is desired to blow an unusually large bulb or when the composition of the electrode glass is such as to make a very fluid melt, a second dipping operation may be used to advantage. Where repeated dipping is employed, it is usually preferable to permit the withdrawn glass to cool somewhat before returning it to the molten body of glass. By this means any desired quantity of electrode glass may be built up prior to blowing it into an expanded bulb.

As an alternative process sometimes useful in making experimental electrodes, we may prepare a finely powdered and homogeneous mixture of the ingredients from which it is desired to form the glass, and then prepare a small globule of molten glass therefrom by dipping into the powdered mixture a platinum wire, transferring the adhering grains to a flame where they become fused, dipping the fused material back again into the powdered mass to pick up a further quantity thereof, and repeating this sequence of operations until a globule of molten glass is obtained on the platinum wire of sufficient size to permit the construction of at least one electrode therefrom. This molten globule may then be transferred to the pre-warmed edge of the supporting tube, allowed to cool to working temperature, and them blown as above indicated.

It will be understood that the details of the above description are intended as exemplary rather than limiting, and that various modifications of the described process may be employed without departing from the essence of our invention as defined by the scope of the appended claims.

We claim as our invention:

1. A method of making a glass electrode having a bulb of one kind of glass sealed upon a body tube of another kind of glass, which method includes the steps of: dipping in a molten bath of said one kind of glass an end of said tube provided with an opening therein sufficiently small that a droplet of glass from said bath will extend across said opening in sealing relationship with said end of said tube when said end is removed from said bath; removing said end of said tube from said bath when the glass of said molten bath has wetted the same around said opening to form said droplet of said one kind of glass adhering to said end of said tube; and then blowing said adhering droplet into said bulb.

2. A method of making a glass electrode having a bulb of one kind of glass sealed to a body tube of another kind of glass, which method comprises the steps of, bringing into contact with a molten body of said one kind of glass an end of said tube having a rim portion and an opening therewithin sufficiently small that a droplet of said one kind of glass will extend across said opening in sealing relationship with said rim portion when said end is withdrawn, withdrawing said end when the glass of said molten body has wetted said rim portion to adhere said droplet to said rim portion across said opening, and then blowing said droplet into said bulb.

3. A method of making a glass electrode having a thin bulb of electrode glass sealed on a body tube of dissimilar glass having a higher specific electrical resistance than said electrode glass, which method includes the steps of lowering into contact with a molten body of said electrode glass an end of said tube provided with a rim portion and an opening therewithin dimensioned with respect to the viscosity and surface tension of said molten body of glass that a droplet of the molten glass will extend across said opening in sealing relation with said rim portion when said end of said tube is raised, raising said end of said tube when said molten glass has wetted said rim portion to adhere said droplet to said rim portion and blowing the adhering droplet while still hot into a thin expanded bulb.

4. A method of making a glass electrode having a thin bulb of electrode glass of one composition sealed on a body tube formed of a glass of different composition which method includes the steps of: forming a molten body of said electrode glass; lowering into contact with said molten body of electrode glass, in a manner to insure uniform contact with the molten glass, an end of said body tube having an opening therein sufficiently small that a droplet from said molten body of glass will extend across said opening; lifting said body tube from said molten body of electrode glass when said molten body has wetted said end of said tube to withdraw a droplet of molten electrode glass adhering to and closing the open end of said body tube; cooling said droplet of molten electrode glass to a glass-blowing temperature; and blowing the adhering droplet of electrode glass into a thin expanded bulb when said droplet reaches such glass-blowing temperature in its cooling, thereby avoiding the application of external heat to said body tube and said droplet of electrode glass between the attachment of said droplet thereto and the blowing of said droplet into said thin expanded bulb.

5. A method of making a glass electrode having a thin bulb of electrode glass of one composition sealed on a body tube formed of a glass of different composition, which method includes the steps of: forming a molten body of said electrode glass and maintaining same in molten condition for a period of time to free same of gas bubbles; touching to the surface of said bubble-free molten body of electrode glass to establish uniform contact with said surface of said molten glass around the periphery of said glass body tube an end of said body tube having an opening therein sufficiently small that a droplet of said molten glass will seal said opening; withdrawing said glass body tube from contact with said molten body when said molten body has wetted said end of said tube to produce said droplet of molten electrode glass adhering to and closing said open end of said glass body tube; and blowing said droplet of electrode glass while still hot into a thin expanded bulb.

6. A method of making a glass electrode having a thin bulb of electrode glass sealed on the end of a glass supporting tube formed of dissimilar glass, which method includes the steps of: producing a molten body of said electrode glass; warming to incipient softness an end of said glass supporting tube having an opening therein sufficiently small that a droplet of molten glass will seal said opening; touching the warmed end of said glass supporting tube to the surface of said body of molten electrode glass to establish uniform contact with and cause said molten glass to wet the end of said glass supporting tube around said opening thereof; lifting said tube from said surface to gather a droplet of electrode glass adhering to said end of said glass supporting tube and in sealing relationship therewith; cooling said adhering droplet to a glass-blowing temperature; and blowing said droplet into a thin expanded bulb upon reaching said glass-blowing temperature.

7. A method of making a glass electrode having a thin bulb of electrode glass sealed on a body tube of dissimilar glass of higher specific electrical resistance than said electrode glass, which method includes the steps of: producing a body of molten electrode glass; touching to the surface of said molten body to effect a sealing juncture with said molten electrode glass an end of said body tube having an opening therein sufficiently small that a droplet of said molten glass will seal said opening; removing said body tube with a droplet of molten electrode glass adhering thereto and in sealing relationship with the end thereof; controlling the amount of electrode glass in said adhering droplet by adjusting the temperature of said body of molten electrode glass and thus determining the electrical resistance of the thin bulb when blown to the desired size; and blowing said adhering droplet to an expanded electrode bulb of said size.

8. A method of making a glass electrode having a glass body tube and a thin bulb formed thereon of electrode glass of a composition dissimilar to that of said body tube and which tends to devitrify rapidly at temperatures in the neighborhood of its working temperature, which method includes the steps of: producing a molten body of said electrode glass substantially free of gas bubbles; touching to the surface of said molten body of electrode glass in a manner to establish uniform contact with said surface around the periphery of said glass body tube an end of said body tube having an opening therein sufficiently small to be sealed by a droplet of molten glass; lifting said glass body tube from said molten body of electrode glass to gather a molten droplet of electrode glass adhering to and closing said end of said glass body tube; rapidly cooling said adhering droplet to a glass-blowing temperature at a cooling rate substantially faster than would be effected by cooling in the atmosphere, thereby preventing devitrification of said electrode glass; and then blowing said adhering droplet into an expanded bulb.

HENRY H. CARY.
WARREN P. BAXTER.